(12) United States Patent
Saito

(10) Patent No.: US 11,494,138 B2
(45) Date of Patent: Nov. 8, 2022

(54) IMAGE FORMING APPARATUS AND CONTROL METHOD THEREOF INCLUDING CONTROL OF PRINT JOB

(71) Applicant: TOSHIBA TEC KABUSHIKI KAISHA, Tokyo (JP)

(72) Inventor: Akira Saito, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/241,555

(22) Filed: Apr. 27, 2021

(65) Prior Publication Data

US 2022/0091801 A1 Mar. 24, 2022

(30) Foreign Application Priority Data

Sep. 18, 2020 (JP) .............................. JP2020-157145

(51) Int. Cl.
*G06F 3/12* (2006.01)
(52) U.S. Cl.
CPC .......... *G06F 3/1234* (2013.01); *G06F 3/1204* (2013.01); *G06F 3/1222* (2013.01); *G06F 3/1238* (2013.01); *G06F 3/1267* (2013.01); *G06F 3/1274* (2013.01)
(58) Field of Classification Search
None
See application file for complete search history.

(56) References Cited

U.S. PATENT DOCUMENTS

| 5,210,571 A | 5/1993 | Peloquin et al. |
| 7,684,064 B2 | 3/2010 | Kimura et al. |
| 2005/0100378 A1* | 5/2005 | Kimura .................. G06F 21/608 400/76 |
| 2006/0187481 A1* | 8/2006 | Hayakawa ............ G06F 3/1238 358/1.14 |
| 2008/0174814 A1 | 7/2008 | Nagata |

FOREIGN PATENT DOCUMENTS

EP 3 709 150 A1 9/2020

OTHER PUBLICATIONS

Extended European Search Report dated Dec. 7, 2021 issued in EP Application No. 21179983.8, 8 pages.

* cited by examiner

*Primary Examiner* — Thomas D Lee
(74) *Attorney, Agent, or Firm* — Foley & Lardner LLP

(57) ABSTRACT

An image forming apparatus includes a processor. The processor is configured to stop a print job under execution in response to an occurrence of an abnormality preventing the print job from continuing, set the stopped print job to a skip state, and restart the print job set to the skip state in response to a restart instruction by a user associated with the print job and not by a second user different from the user associated with the print job.

21 Claims, 4 Drawing Sheets

IMAGE FORMING APPARATUS AND CONTROL METHOD THEREOF INCLUDING CONTROL OF PRINT JOB

CROSS-REFERENCE TO RELATED APPLICATION

This application is based upon and claims the benefit of priority from Japanese Patent Application No. 2020-157145, filed on Sep. 18, 2020, the entire contents of which are incorporated herein by reference.

FIELD

Embodiments described herein relate generally to an image forming apparatus and a control method thereof.

BACKGROUND

An image forming apparatus interrupts a print job when an abnormality, such as a paper jam, that makes printing unable to continue occurs during execution of the print job. Then, when the abnormality is resolved, the interrupted print job is restarted.

When a user leaves the image forming apparatus after requesting the execution of the print job, if the print job is interrupted due to the occurrence of the abnormality described above, another user may perform work for resolving the abnormality. The interrupted print job is then restarted. In this case, there is a concern that the user who resolved the abnormality may take printed matter of another user from the image forming apparatus.

Under these circumstances, the image forming apparatus that can prevent the printed matter from being handed over to the hands of a user other than the user associated with the print job is preferred.

DETAILED DESCRIPTION

At least one embodiment provide an image forming apparatus that can prevent printed matter produced by a print job from being handed over to a user different from a user associated with the print job and a control method thereof.

In general, according to at least one embodiment, an image forming apparatus including a stop unit (e.g., a stop device), a setting unit (e.g., a setting device), and a restart unit (e.g., a restart device) is provided. The stop unit is configured to stop a print job in progress if there is an occurrence of an abnormality that makes the print job unable to continue. The setting unit is configured to set the print job stopped by the stop unit to a skip state. The restart unit is configured to restart the print job set to the skip state by the setting unit according to a restart instruction by a user associated with the print job and not to receive the restart instruction by a second user different from the original user associated with the print job.

Hereinafter, an example of at least one embodiment will be described with reference to the accompanying drawings. In at least one embodiment, a multifunction peripheral (MFP) having a function as an image forming apparatus will be described as an example.

Figure 1:
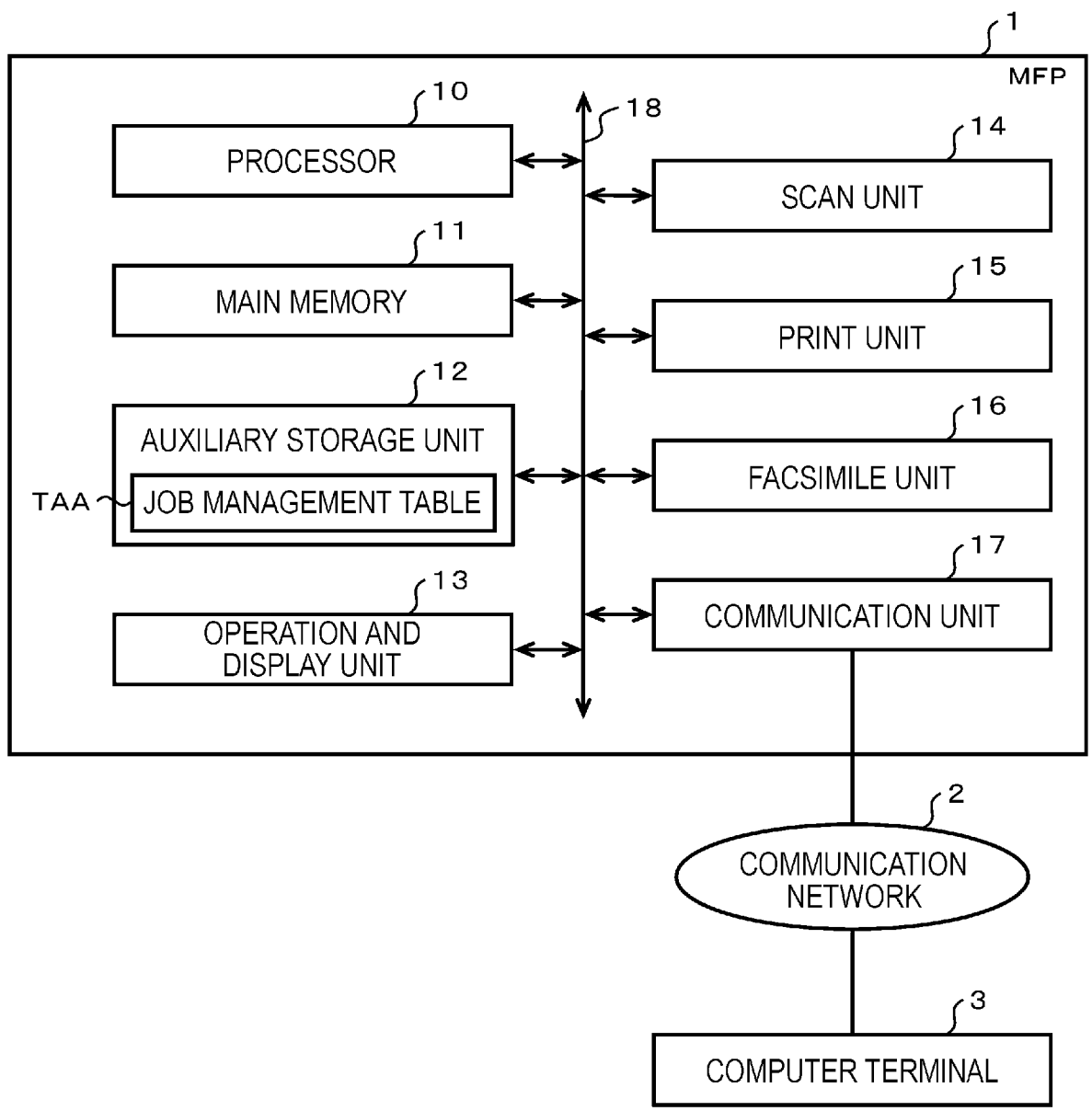
FIG. 1 is a block diagram illustrating a circuit configuration of a main part of an MFP according to at least one embodiment.

FIG. 1 is a block diagram illustrating a circuit configuration of a main part of an MFP 1 according to at least one embodiment.

The MFP 1 includes a processor 10, a main memory 11, an auxiliary storage unit 12 (e.g., an auxiliary memory), an operation and display unit 13 (e.g., an operation and display device), a scan unit 14 (e.g., a scanner), a print unit 15 (e.g., a printer), a facsimile unit 16 (e.g., a facsimile machine), a communication unit 17 (e.g., a communication device or interface), a transmission line 18, and the like. The processor 10, the main memory 11, the auxiliary storage unit 12, the operation and display unit 13, the scan unit 14, the print unit 15, the facsimile unit 16, and the communication unit 17 are connected through the transmission line 18.

A computer that performs information processing for controlling the MFP 1 is configured by connecting the processor 10, the main memory 11, and the auxiliary storage unit 12 through the transmission line 18.

The processor 10 corresponds to a central part of the computer. The processor 10 executes information processing (e.g., by executing instructions stored in the main memory 11) for controlling one or more parts of the computer in order to realize various functions as the MFP 1 according to an information processing program such as an operating system and an application program.

The main memory 11 corresponds to a main memory portion of the computer. The main memory 11 includes a non-volatile memory area and a volatile memory area. The main memory 11 stores the information processing program described above in the non-volatile memory area. The main memory 11 may store data necessary for the processor 10 to execute a process for controlling each part in the non-volatile or volatile memory area. In the main memory 11, the volatile memory area is used as a work area where data is appropriately rewritten by the processor 10.

The auxiliary storage unit 12 corresponds to an auxiliary storage portion of the computer. As the auxiliary storage unit 12, for example, an electric erasable programmable read-only memory (EEPROM), a hard disk drive (HDD), a solid state drive (SSD), or various other well-known storage devices can be used. The auxiliary storage unit 12 stores data used by the processor 10 for performing various processes and data generated by the processes in the processor 10. The auxiliary storage unit 12 may store the information processing program described above. A part of the storage area of the auxiliary storage unit 12 is used as an area for storing a job management table TAA. The job management table TAA is a data table for managing a print job (hereinafter referred to as an uncompleted job) that is not completed. The uncompleted job is a print job in a start waiting state. Alternatively, the uncompleted job is a print job that was started once but skipped.

Figure 2:
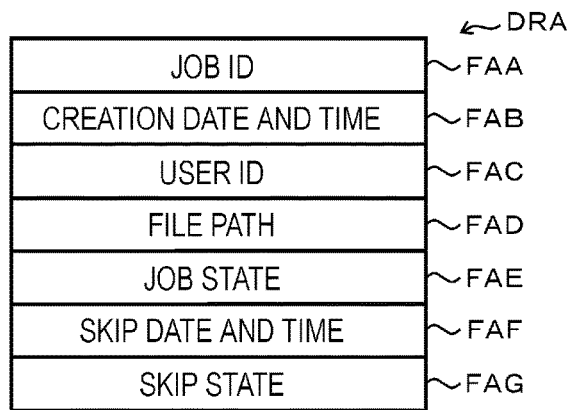
FIG. 2 is a table schematically illustrating a configuration of a data record included in a job management table illustrated in FIG. 1 according to at least one embodiment.

FIG. 2 is a table schematically illustrating a configuration of a data record DRA included in the job management table TAA.

The job management table TAA includes the data record DRA with which the uncompleted job is associated. The data record DRA includes fields FAA, FAB, FAC, FAD, FAE, FAF, and FAG. In the field FAA, a job identifier (ID) as an identifier of the uncompleted job is set. In the field FAB, the date and time when the uncompleted job was generated is set. In the field FAC, a user ID of the user associated with the uncompleted job is set. In the field FAD, a file path of an image file representing an image to be printed by the uncompleted job is set. In the field FAE, data representing a state of the uncompleted jobs is set. In the field FAF, the date and time when the uncompleted job was skipped is set in the field FAF. In the field FAG, data indicating in which state the uncompleted job is skipped is set.

The operation and display unit 13 inputs an operation by the user and displays various information for presenting to the user. The operation and display unit 13 may appropriately include various operation devices and display devices such as a touch panel, a keyboard, a key switch, an LED lamp, or a liquid crystal display panel.

The scan unit 14 reads a document and generates image data of an image displayed on the document.

The print unit 15 prints the image represented by the image data on recording paper. The print unit 15 includes a well-known print device such as an electrophotographic image forming device.

The facsimile unit 16 performs various well-known processes for performing image communication conforming to a facsimile standard through a communication network (not illustrated) such as a public switched telephone network (PSTN).

The communication unit 17 executes a communication process for performing data communication through a communication network 2. For example, an existing communication device for a local area network (LAN) can be used as the communication unit 17.

The communication network 2 may be the Internet, virtual private network (VPN), LAN, public communication network, mobile communication network, and the like, used alone or in an appropriate combination. For example, the LAN is used as s the communication network 2.

A computer terminal 3 is an information processing device having a function of data communication through the communication network 2. The computer terminal 3 is, for example, an information terminal for requesting the MFP 1 to execute the print job through the communication network 2.

Next, an operation of the MFP 1 configured as described above will be described. The contents of the processes described below are examples, and it is possible to appropriately change the order of some processes, omit some processes, or add another process.

In the MFP 1, the processor 10 controls each part of the MFP 1 in order to control a print function, a copy function, a scan function, a facsimile function, and the like in the same manner as those performed by the existing the MFP of the same type. The description of information processing for this control will be omitted. In the following, the management of print jobs will be described.

When the processor 10 is started in an operation mode that enables the print job to be executed, the processor 10 executes information processing (hereinafter referred to as a management process) based on the information processing program stored in the main memory 11 or the auxiliary storage unit 12.

Figure 3:
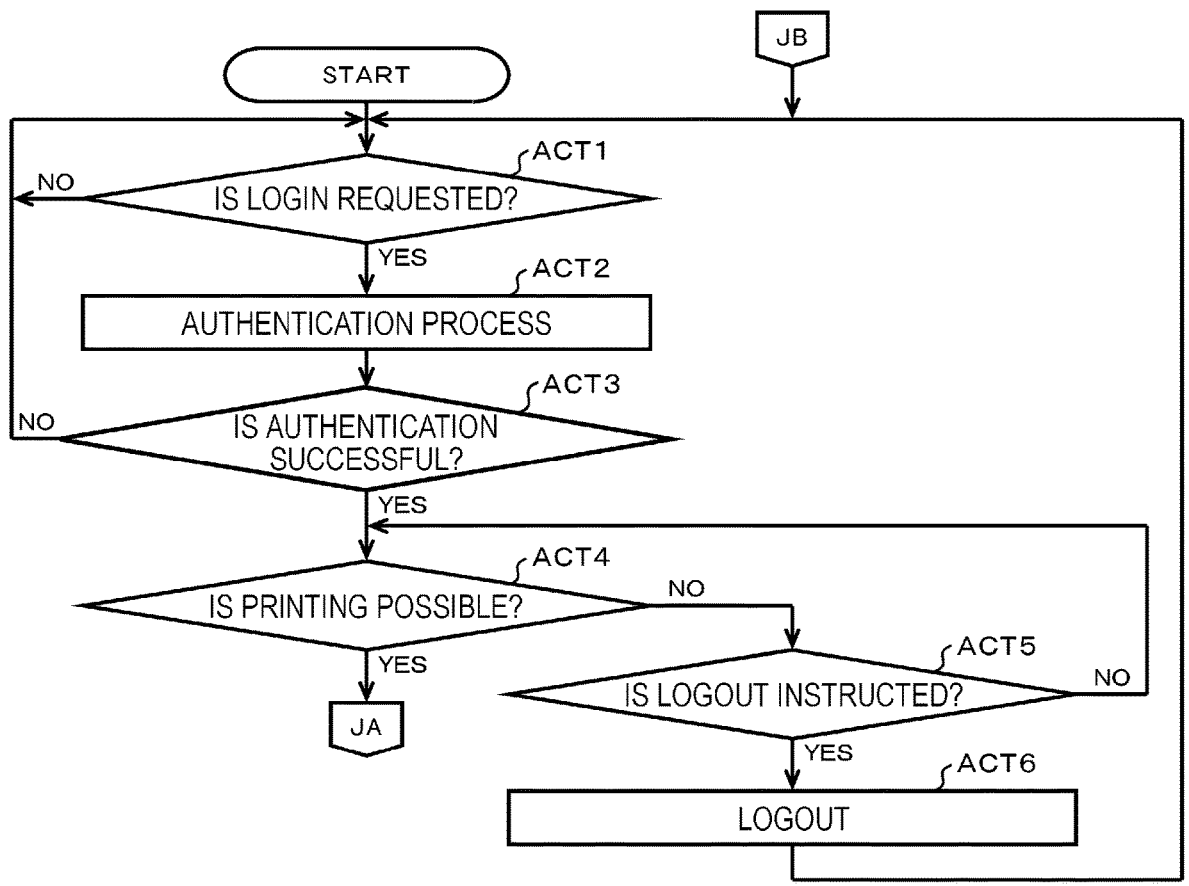
FIG. 3 is a flowchart of a management process according to at least one embodiment.
Figure 4:
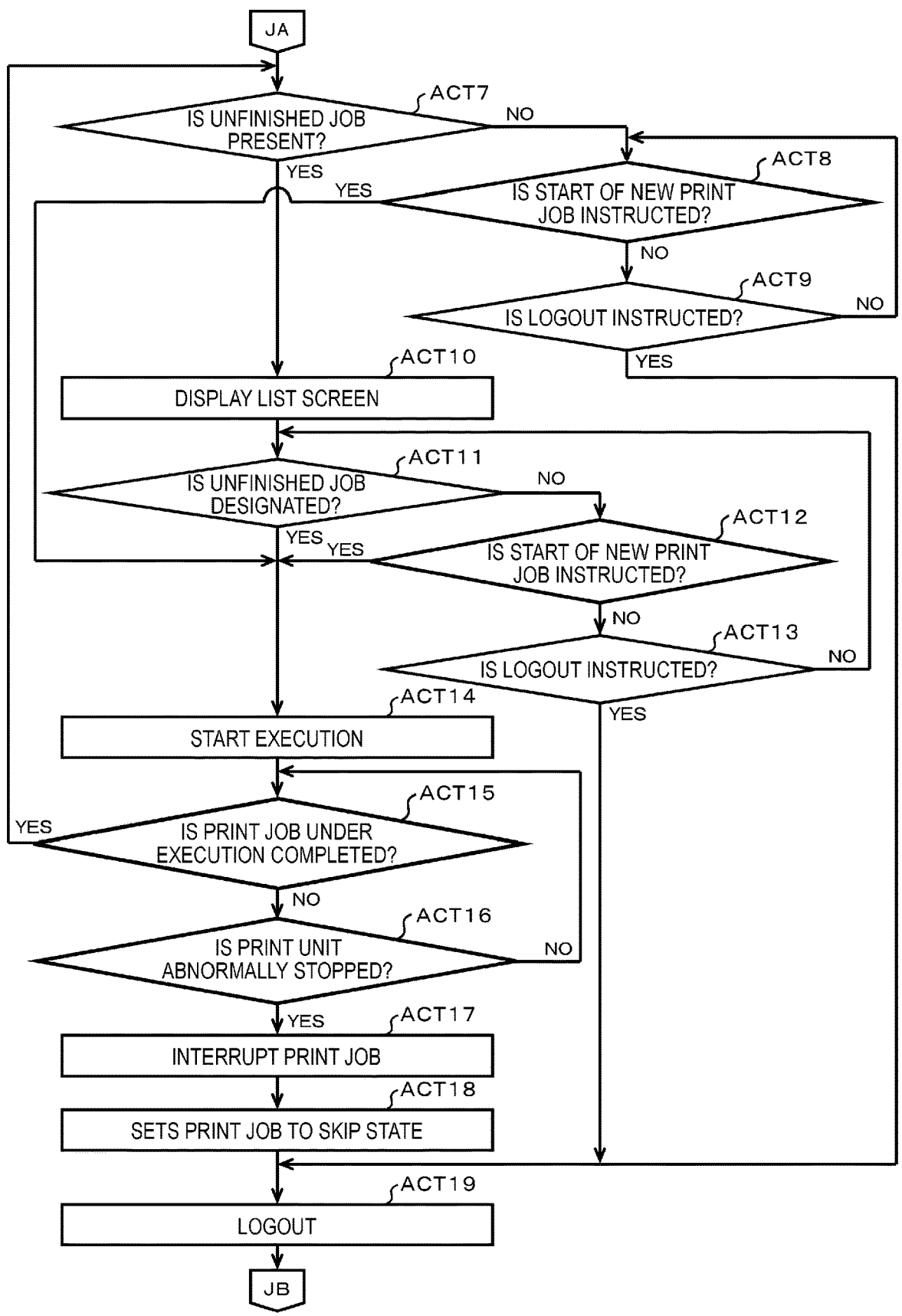
FIG. 4 is another flowchart of the management process according to at least one embodiment.

FIGS. 3 and 4 are flowcharts of the management process.

As ACT 1 in FIG. 3, the processor 10 waits for a login request by a user.

When a user intends to request the MFP 1 to execute some function accompanied by a print job, the user requests login by, for example, a predetermined operation in the operation and display unit 13. In response to this request, the processor 10 determines that the result in ACT 1 is YES and proceeds to ACT 2. The functions accompanied by the print job include, for example, the print function, the facsimile function, and the copy function. The print function is a function of printing by the print unit 15 in response to a print request through the communication network 2. The facsimile function is a function of printing an image, which is acquired by facsimile communication by the facsimile unit 16, by the print unit 15. The copy function is a function of printing an image, which is obtained by scanning a document with the scan unit 14, by the print unit 15.

As ACT 2, the processor 10 performs an authentication process for authenticating the user who requested the login. For example, the processor 10 allows the user to input the user ID and a password, and authenticates the user as a user who is associated with a combination of the user ID and the password. Alternatively, the processor 10 authenticates the user, for example, based on authentication information read from an ID card by a card reader (not illustrated). The user authentication method may be any method such as other well-known methods.

In ACT 3, the processor 10 checks whether or not the authentication in ACT 2 is successful. Then, if the authentication fails, the processor 10 determines that the result in ACT 2 is NO and returns to a waiting state of ACT 1. In this case, the processor 10 may execute a notification operation such as causing a screen to display information for notifying the user that the authentication fails on the operation and display unit 13. The processor 10 may also return to ACT 2.

If the authentication is successful, the processor 10 determines that the result in ACT 3 is YES and proceeds to ACT 4.

As ACT 4, the processor 10 checks whether or not the print unit 15 can start print. Then, if the processor 10 cannot start print, the processor 10 determines that the result in ACT 4 is NO and proceeds to ACT 5.

As ACT 5, the processor 10 checks whether or not a logout is instructed. Then, if the corresponding instruction cannot be checked, the processor 10 determines that the result in ACT 5 is NO and returns to ACT 4.

Thus, as ACT 4 and ACT 5, the processor 10 waits for the start of print to be possible or logout to be instructed. In this case, the processor 10 may execute the notification operation such as generating a notification on a screen for notifying the user that print cannot be started to be displayed on the operation and display unit 13.

If the user gives up the execution of the print job, the user instructs the logout by a predetermined operation or the like in the operation and display unit 13. Then, the processor 10 determines that the result in ACT 5 is YES and proceeds to ACT 6.

As ACT 6, the processor 10 logs out the logged-in user. Then, the processor 10 returns to the waiting state of ACT 1.

Now, if the print unit 15 can start print, the processor 10 determines that the result in ACT 4 is YES and proceeds to ACT 7 in FIG. 4.

As ACT 7, the processor 10 checks whether or not an uncompleted job is present. Then, if the uncompleted job is not present, the processor 10 determines that the result in ACT 7 is NO and proceeds to ACT 8.

As ACT 8, the processor 10 checks whether or not the start of a new print job is instructed. Then, if the corresponding instruction cannot be checked, the processor 10 determines that the result in ACT 8 is NO and proceeds to ACT 9.

As ACT 9, the processor 10 checks whether or not logout is instructed. Then, if the corresponding instruction cannot be checked, the processor 10 determines that the result in ACT 9 is NO and returns to ACT 8.

Thus, as ACT 8 or ACT 9, the processor 10 waits for an instruction to start or logout made.

Now, when a new function accompanied by a print job is requested, the processor 10 executes an update process for updating the job management table TAA for managing a print job (hereinafter referred to as a new job) for the function separately from the management process. Then, in the update process, the processor 10 adds a new data record DRA associated with the requested print job to the job management table TAA. The processor 10 sets each data in each field of this new data record DRA as follows.

The processor 10 determines a new job ID and sets the new job ID in the field FAA so that the new job can be distinguished from one or more other print jobs.

The processor 10 sets, for example, the date and time when the data record DRA is generated in the field FAB. The processor 10 may set the date and time at another optional time point, such as the time point when an event that triggered generation of a new job occurs, in the field FAB.

When the user ID can be specified, the processor 10 sets the user ID in the field FAC. For example, when the new job is related to the print function, the processor 10 sets the user ID of a requester in the field FAC when the user ID of the requester can be acquired. For example, when the new job is related to the facsimile function, the processor 10 sets a user ID of a recipient in the field FAC when the recipient is designated. For example, when the new job is related to the copy function, the processor 10 sets the user ID of the logged-in user in the field FAC. When the user ID cannot be specified, the processor 10 sets predetermined invalid data in the field FAC. When the user ID cannot be specified, the processor 10 may leave the field FAC in a blank state.

The processor 10 sets a file path of the image file to be printed in the new job in the field FAD. The processor 10 stores, for example, an image file including image data transmitted along with a request for the print function or the facsimile function and received by the facsimile unit 16 or the communication unit 17 in the auxiliary storage unit 12, and sets the file path of the image file in the field FAD. For example, in the case of a request for the copy function, the processor 10 determines the file path for the image file including the image data obtained by the scan unit 14 and sets the file path in the field FAD.

The processor 10 sets data indicating that the print job is in the start waiting state in the field FAE.

The processor 10 sets predetermined invalid data in the fields FAF and FAG. The processor 10 may leave the fields FAF and FAG in the blank state. The processor 10 may not include the fields FAF and FAG in the data record DRA generated here.

The processor 10 adds the data record DRA to the job management table TAA whenever a new job occurs even in the state where an uncompleted job exists. Thus, the job management table TAA does not include any data record DRA if there is no uncompleted job. The job management table TAA includes only one data record DRA if only one uncompleted job is present. The job management table TAA includes a plurality of data records DRAs associated with a plurality of uncompleted jobs, respectively, when the plurality of uncompleted jobs exist.

For example, if the job management table TAA includes at least one data record DRA, the processor 10 determines that an uncompleted job is present and determines that the result in ACT 7 in FIG. 4 is YES and proceeds to ACT 10.

As ACT 10, the processor 10 causes a list screen, for example, to be displayed on the operation and display unit 13. The list screen represents a list of uncompleted jobs, and is a screen for allowing the user to designate a print job to be executed from among the uncompleted jobs. For example, the processor 10 extracts a data record DRA in which the user ID set in the field FAC matches the user ID of the logged-in user, and a data record DRA in which invalid data is set in the field FAC, from the data records DRA included in the job management table TAA. Then, the processor 10 shows the uncompleted jobs with which the data record DRA extracted in this way is associated in the list.

The user determines one of the uncompleted jobs displayed on the list screen as a print job to be executed, and designates the uncompleted job by, for example, a predetermined operation in the operation and display unit 13. Alternatively, if the user instructs the start of a new print job that is not an uncompleted job in order to use the copy function or the like, the user instructs the start of the job by, for example, a predetermined operation in the operation and display unit 13.

As ACT 11, the processor 10 checks whether or not an uncompleted job to be executed is designated. Then, if the corresponding designation cannot be checked, the processor 10 determines that the result in ACT 11 is NO and proceeds to ACT 12.

As ACT 12, the processor 10 checks whether or not the start of the new print job is instructed. Then, if the corresponding instruction cannot be checked, the processor 10 determines that the result in ACT 12 is NO and proceeds to ACT 13.

As ACT 13, the processor 10 checks whether or not the logout is instructed. Then, if the corresponding instruction cannot be checked, the processor 10 determines that the result in ACT 13 is NO and returns to ACT 11.

Thus, as ACT 11 to ACT 13, the processor 10 waits for a print job to be designated, or to be instructed to start or log out.

If the user designates one of the uncompleted jobs as described above, the processor 10 determines that the result in ACT 11 is YES and proceeds to ACT 14. If the start of the print job is instructed as described above, the processor 10 determines that the result in ACT 8 or ACT 12 is YES, and proceeds to ACT 14.

As ACT 14, the processor 10 starts execution of the designated uncompleted job or the instructed new print job. The processor 10 instructs the print unit 15 to start print, for example, accompanied by designation of a target image file. The processor 10 designates the image file, for example, by notifying the file path set in the field FAD of the data record DRA associated with the uncompleted job or the instructed new print job. When the copy function is required, the processor 10 instructs the scan unit 14 to start scanning accompanied by the notification of the above file path.

When the print function or facsimile function is required, the print unit 15 prints an image based on the image data included in the image file specified by the notified file path.

When the copy function is requested, the scan unit 14 scans the set document to generate image data and stores the image data in the auxiliary storage unit 12 as an image file specified by the notified file path described above. The print unit 15 prints an image based on the image data included in the image file specified in the notified file path, that is, the image file stored in the auxiliary storage unit 12 as described above.

As ACT 15, the processor 10 checks whether or not the print job under execution is completed. Then, if the completion of the print job cannot be checked, the processor 10 determines that the result in ACT 15 is NO and proceeds to ACT 16.

As ACT 16, the processor 10 checks whether or not the print unit 15 is stopped abnormally. Then, if the abnormal stop cannot be checked, the processor 10 determines that the result in ACT 16 is NO and returns to ACT 15.

Thus, as ACT 15 and ACT 16, the processor 10 waits for the completion or abnormal stop of the print job.

When the print unit 15 completes print based on all the image data included in the image file specified by the notified file path, the print unit 15 notifies the processor 10 of the completion of print. However, the print unit 15 stops the print operation when print cannot be continued due to some abnormality such as a paper jam or running-out of paper. Then, in this case, the print unit 15 notifies the processor 10 of the abnormal stop. In this way, the print unit 15 has a function as a stop unit.

When the completion of print is notified as described above, the processor 10 determines that the result in ACT 15 is YES, returns to ACT 7, and repeats the subsequent actions in the same manner as described above.

When the abnormal stop is notified as described above, the processor 10 determines that the result in ACT 16 is YES and proceeds to ACT 17.

As ACT 17, processor 10 interrupts the print job under execution.

As ACT 18, the processor 10 sets the interrupted print job to a skip state. The processor 10 rewrites, for example, the field FAE of the data record DRA associated with the interrupted print job with data representing the skip state. The processor 10 rewrites, for example, the field FAF of the data record DRA associated with the interrupted print job with the current date and time. For example, the processor 10 rewrites the field FAG of the data record DRA associated with the interrupted print job with data indicating how far the interrupted print job is completed. Thus, the computer having the processor 10 as a central part functions as a skipping unit (e.g., a skipping device) by executing information processing based on the information processing program by the processor 10.

The processor 10 then proceeds to ACT 19. When the processor 10 is in the waiting state of ACT 8 or ACT 9, or in the waiting state of ACT 11 to ACT 13, if the logout instructed, for example, by a predetermined operation in the operation and display unit 13 by the user, the processor 10 determines that the result in ACT 9 or ACT 13 is YES, and proceeds to ACT 19.

As ACT 19, the processor 10 logs out. Then, the processor 10 returns to the waiting state of ACT 1 in FIG. 3.

When the processor 10 proceeds to ACT 19 from ACT 18, the processor 10 releases an operated state in which the user authenticated by the authentication process in ACT 2 in FIG. 2 is the operator according to the abnormal stop of the print job. Then, the processor 10 sets this operated state according to the success of the authentication process in ACT 2 in FIG. 2. Thus, the computer having the processor 10 as the central part functions as an operator management unit (e.g. an operator management device) by executing information processing based on the information processing program by the processor 10.

When the processor 10 returns to the waiting state of ACT 1 in FIG. 3 through ACT 18 in FIG. 4, the interrupted print job is left as the uncompleted job in the skip state. In this case, the processor 10 logs out without a logout instruction by the user, and shifts to a state of waiting for a new login request. Thus, even if the abnormality that caused the abnormal stop is resolved and the print unit 15 is in a state where print can be stated, the processor 10 does not print the interrupted print job.

Then, the print job in the skip state is included as one of the uncompleted jobs in the list displayed on the list screen displayed by ACT 10 in FIG. 4, and the processor 10 enables the print job in the skip state to be designated as the print job to be executed. Then, when the print job in the skip state is designated by the user, the processor 10 instructs the print unit 15 to perform the print operation following the previous interruption based on the data which is set in the field FAG of the data record DRA with which the print job is associated. When the processor 10 executes information processing based on the information processing program in this way, the computer having the processor 10 as the central part functions as a restart unit.

The processor 10 executes information processing (hereafter referred to as a deletion process) based on the information processing program stored in the main memory 11 or the auxiliary storage unit 12 separately from the update process and management process described above every time a predetermined execution timing is reached. The execution timing may be optionally determined by the designer or administrator of the MFP 1. As an example, the execution timing is assumed to be the timing at regular time intervals such as every 24 hours, the timing when a free capacity of the auxiliary storage unit 12 becomes equal to or less than a predetermined threshold value, and the like.

Figure 5:
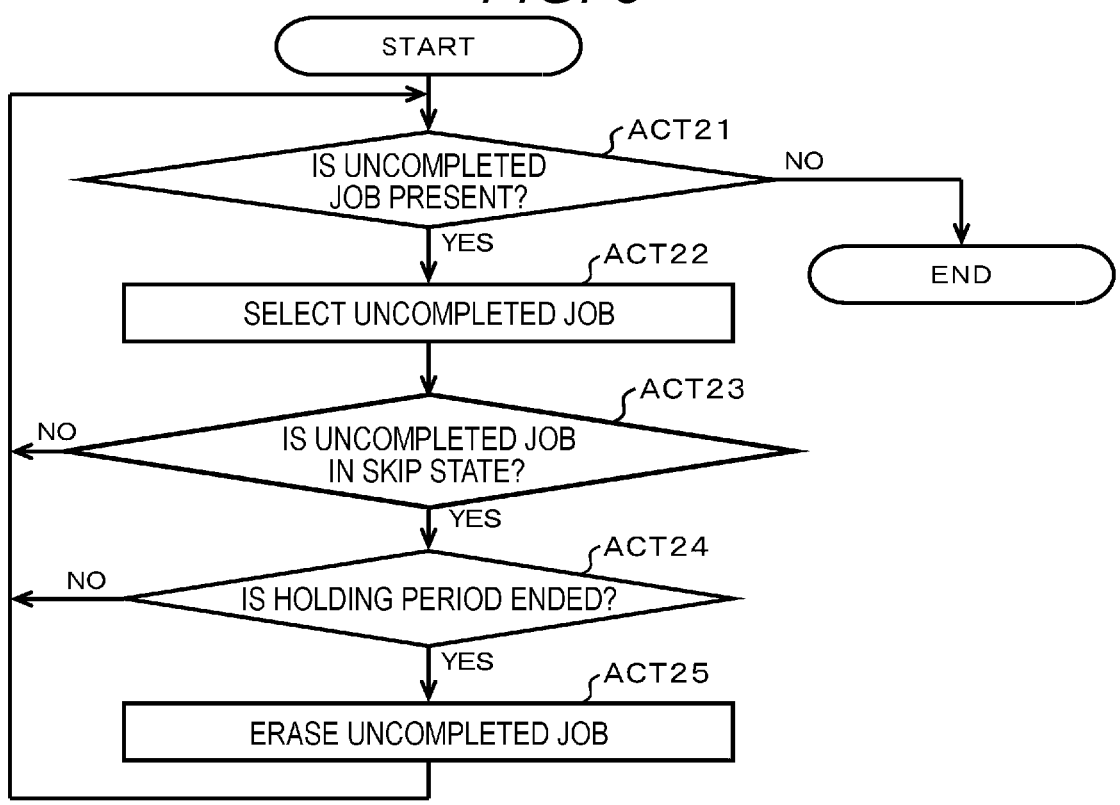
FIG. 5 is a flowchart of a deletion process according to at least one embodiment.

FIG. 5 is a flowchart of the deletion process.

As ACT 21, the processor 10 checks whether or not an uncompleted job that is not selected is present in this deletion process. For example, when the processor 10 first proceeds to ACT 21 after the start of the deletion process, if the job management table TAA includes at least one data record DRA, the processor 10 determines that an unselected uncompleted job is present. Then, if there is an uncompleted job that is not selected, the processor 10 determines that the result in ACT 21 is YES and proceeds to ACT 22.

As ACT 22, the processor 10 selects one uncompleted job.

As ACT 23, the processor 10 checks whether or not the selected uncompleted job is in the skip state. For example, if the data, which is set in the field FAG of the data record DRA with which the selected uncompleted job is associated, represents the skip state, the processor 10 determines that the selected uncompleted job is in the skip state. Then, if the selected uncompleted job is in the skip state, the processor 10 determines that the result in ACT 23 is YES and proceeds to ACT 24.

As ACT 24, the processor 10 checks whether or not a holding period for the selected uncompleted job is ended. For example, if the elapsed time from the date and time, which is set in the field FAF of the data record DRA associated with the selected uncompleted job, is equal to or longer than a predetermined time limit for the selected uncompleted job, the processor 10 determines that the holding period is ended. Then, if the holding period is ended, the processor 10 determines that the result in ACT 24 is YES and proceeds to ACT 25.

As ACT 25, the processor 10 erases the selected uncompleted job. The processor 10 deletes, for example, the data record DRA associated with the uncompleted job from the job management table TAA. The processor 10 then returns to ACT 21. Thus, by executing information processing based on the information processing program by the processor 10, the computer having the processor 10 as the central part functions as an exclusion unit (e.g., an exclusion device).

The processor 10 determines that the result in ACT 23 is NO if the selected uncompleted job is not in the skip state and the result in ACT 24 is NO if the holding period for the selected uncompleted job is not ended, and in either case, the processor passes ACT 25 and returns to ACT 21. That is, the processor 10 does not erase the uncompleted jobs that are not in the skip state and the uncompleted jobs whose holding periods are not ended.

Now, when the processor 10 returns to ACT 21 from any of ACT 23, ACT 24, and ACT 25, the processor 10 checks whether or not there are uncompleted jobs excluding the uncompleted jobs already selected when ACT 22 was executed so far in this deletion process. Then, when the processor 10 proceeds to ACT 22 because there are corresponding uncompleted jobs, the processor 10 selects one of the uncompleted jobs excluding the uncompleted jobs already selected when ACT 22 was executed so far. That is, the processor 10 executes ACT 23 to ACT 25 in the same manner as described above while sequentially targeting each of the uncompleted jobs. With this configuration, the processor 10 excludes the uncompleted job in the skipped state whose holding period is ended from the uncompleted jobs.

After executing ACT 23 to ACT 25 targeted for all uncompleted jobs as described above, the processor 10 determines that the result in ACT 21 is NO and ends the deletion process.

As described above, according to the MFP 1, the print job stopped abnormally is set to the skip state, and even if the abnormality is resolved, the print job is not automatically restarted. Then, the print job in the skip state is restarted according to an execution instruction by the user associated with the print job. The print job in the skipped state is not targeted for an execution instruction by a user other than the user associated with the print job, and is not restarted according to an instruction by such another user. Accordingly, the print job cannot be restarted without the involvement of the user associated with the print job, and the printed matter produced by the print job can be prevented from being handed over to another user.

According to the MFP 1, after the abnormally stopped print job is in the skip state, an execution instruction for another print job is received and the other print job can be started according to such an instruction. Accordingly, another job can be executed without waiting for the abnormally stopped print job to be restarted and completed.

According to the MFP 1, the print job stopped abnormally is set to the skip state, and the interrupted state of the print job is promptly resolved. With this configuration, even if power saving control is performed so as not to shift to a power saving state in the interrupted state of the print job, it is possible to shift to the power saving state without waiting for the abnormally stopped print job to be restarted and completed.

In the MFP 1, the user is not involved in setting the abnormally stopped print job to the skip state. For that reason, there is a concern that the print job in the skip state may be left unattended for a long time. However, the MFP 1 excludes the print job in the skip state whose holding period is ended from the uncompleted jobs. With this configuration, the print job left unattended as described above can be prevented from being accumulated in the uncompleted jobs.

At least one embodiment can be implemented by being modified in various ways as follows.

Similar implementation is possible in various devices with print functions, such as printers, facsimile machines, or copiers.

The processor 10 may restart an uncompleted job associated with a user other than the instructor according to an instruction from an administrator or the like having special authority.

The processor 10 does not need to perform the deletion process. Alternatively, the processor 10 may perform the deletion process when the deletion process is set to be performed by the administrator of the MFP 1 or the like.

The processor 10 may automatically cause the job with which the user is not associated to be restarted after the abnormality is resolved without setting the job to the skip state.

After setting the job to the skip state in ACT 18 in FIG. 4, the processor 10 may not shift directly to ACT 19, but may shift to ACT 19 upon receiving a logout instruction or upon the lapse of a predetermined wait time.

Each function realized by the processor 10 by information processing can also be partly or entirely realized by hardware that executes information processing that is not based on a program such as a logic circuit. Each of the functions described above can be realized by combining software control with the hardware such as the logic circuit described above.

While certain embodiments have been described, these embodiments have been presented by way of example only, and are not intended to limit the scope of the inventions. Indeed, the novel embodiments described herein may be embodied in a variety of other forms. Furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus comprising:
a processor configured to:
  stop a print job under execution in response to an occurrence of an abnormality preventing the print job from continuing;
  set the stopped print job to a skip state;
  restart the print job set to the skip state in response to a restart instruction by a user associated with the print job and not by a second user different than the user associated with the print job;
  set an operational state by an operator in response to successful authentication of the operator;
  in the operational state, receive an instruction to restart a print job with which the authenticated operator is associated as a user;
  release the operational state in response to the stop of the print job,
the processor further configured to be coupled to a display, the processor being configured to:
  cause a first notification to be displayed on the display, the first notification indicating that authentication of a user has failed;
  cause a second notification to be displayed on the display, the second notification indicating that the print job cannot be started;

extract a data record in which a user ID set in a data field of a job management table matches a user ID of a logged in user;

extract another data record in which invalid data is set in another data field of the job management table; and cause a list screen to be displayed on the display based on the extracted data records, the list screen representing a list of uncompleted jobs.

2. The apparatus of claim 1, wherein the processor is further configured to exclude the print job set to the skip state from a job group waiting for execution after an end of a predetermined holding period.

3. The apparatus of claim 1, wherein the processor is further configured to restart the print job which is set to the skip state and is not associated with any user according to a restart instruction by an operator.

4. The apparatus of claim 1, wherein the processor is further configured to:

determine that an uncompleted job is not selected in a deletion process; and in response to the determination that the uncompleted job is not selected, select the uncompleted job.

5. The apparatus of claim 4, wherein the processor is further configured to:

determine if the selected uncompleted job is in the skip state;

in response to the selected uncompleted job being in the skip state, determine whether a holding period for the selected uncompleted job has ended; and in response to the holding period being ended, erase the selected uncompleted job.

6. The apparatus of claim 5, wherein the processor is further configured to:

determine whether there are uncompleted jobs excluding the uncompleted job already selected;

in response to the determination that there are uncompleted jobs, select one of the uncompleted jobs excluding the uncompleted job previously selected; and sequentially target each of the uncompleted jobs to exclude the uncompleted job in the skip state when the holding period has ended.

7. The apparatus of claim 1, wherein the user associated with the print job is an administrator.

8. A control method for operating an image forming apparatus, the method comprising:

stopping a print job under execution in response to an occurrence of abnormality preventing the print job from continuing to execute;

setting the print job stopped to a skip state;

restarting the print job in the skip state in response to a restart instruction by a user associated with the print job, and not by a second user different than the user associated with the print job;

setting an operational state by an operator in response to successful authentication of the operator;

in the operational state, receiving an instruction to restart a print job with which the authenticated operator is associated as a user;

releasing the operational state in response to the stop of the print job;

displaying a first notification, the first notification indicating that authentication of a user has failed;

displaying a second notification, the second notification indicating that the print job cannot be started;

extracting a data record in which a user ID set in a data field of a job management table matches a user ID of a logged in user;

extracting another data record in which invalid data is set in another data field of the job management table; and cause display of a list screen based on the extracted data records, the list screen representing a list of uncompleted jobs.

9. The method of claim 8, further comprising excluding the print job set to the skip state from a job group waiting for execution after the end of a predetermined holding period.

10. The method of claim 9, further comprising restarting the print job which is set to the skip state and is not associated with any user according to a restart instruction by an operator.

11. The method of claim 8, further comprising:

determining that an uncompleted job is not selected in a deletion process; and in response to the determination that the uncompleted job is not selected, selecting the uncompleted job.

12. The method of claim 11, further comprising:

determining whether the selected uncompleted job is in the skip state;

in response to the selected uncompleted job being in the skip state, determining whether a holding period for the selected uncompleted job has ended; and in response to the holding period being ended, erasing the selected uncompleted job.

13. The method of claim 12, further comprising:

determining whether there are uncompleted jobs excluding the uncompleted job already selected;

in response to the determination that there are uncompleted jobs, selecting one of the uncompleted jobs excluding the uncompleted job already selected; and sequentially targeting each of the uncompleted jobs to exclude the uncompleted job in the skip state wherein the holding period has ended.

14. The method of claim 8, wherein the user associated with the print job is an administrator.

15. A non-transitory computer readable medium storing a program, which when executed by a processor, causes the processor to execute operations comprising:

stopping a print job under execution in response to an occurrence of abnormality preventing the print job from continuing to execute;

setting the print job stopped to a skip state;

restarting the print job in the skip state in response to a restart instruction by a user associated with the print job, and not by a second user different than the user associated with the print job;

setting an operational state by an operator in response to successful authentication of the operator;

in the operational state, receiving an instruction to restart a print job with which the authenticated operator is associated as a user;

releasing the operational state in response to the stop of the print job;

displaying a first notification, the first notification indicating that authentication of a user has failed;

causing display of a second notification, the second notification indicating that the print job cannot be started;

extracting a data record in which a user ID set in a data field of a job management table matches a user ID of a logged in user;

extracting another data record in which invalid data is set in another data field of the job management table; and causing display of a list screen based on the extracted data record, the list screen representing a list of uncompleted jobs.

16. The non-transitory computer readable medium of claim 15, wherein the operations further comprise excluding the print job set to the skip state from a job group waiting for execution after the end of a predetermined holding period.

17. The non-transitory computer readable medium of claim 15, wherein the operations further comprise restarting the print job which is set to the skip state and is not associated with any user according to a restart instruction by an operator.

18. The non-transitory computer readable medium of claim 15, wherein the operations further comprise:
  determining that an uncompleted job is not selected in a deletion process; and
  in response to the determination that the uncompleted job is not selected, selecting the uncompleted job.

19. The non-transitory computer readable medium of claim 18, wherein the operations further comprise:
  determining whether the selected uncompleted job is in the skip state;
  in response to the selected uncompleted job being in the skip state, determining whether a holding period for the selected uncompleted job has ended; and
  in response to the holding period being ended, erasing the selected uncompleted job.

20. The non-transitory computer readable medium of claim 19, wherein the operations further comprise:
  determining there are uncompleted jobs excluding the uncompleted job already selected;
  in response to the determination that there are uncompleted jobs, selecting one of the uncompleted jobs excluding the uncompleted job already selected; and
  sequentially targeting each of the uncompleted jobs to exclude the uncompleted job in the skip state when the holding period has ended.

21. The non-transitory computer readable medium of claim 15, wherein the user associated with the print job is an administrator.

* * * * *